Dec. 3, 1957  A. W. WESTPHAL ET AL  2,815,184
AIRCRAFT ENGINE HOIST AND MOUNTING SYSTEM
Filed April 2, 1954   3 Sheets-Sheet 1

INVENTORS:
Armin W. Westphal
Jesse Tom Laurie
Bernard F. Irwin

By Hubert E. Metcalf
Their Patent Attorney

Dec. 3, 1957  A. W. WESTPHAL ET AL  2,815,184
AIRCRAFT ENGINE HOIST AND MOUNTING SYSTEM
Filed April 2, 1954  3 Sheets-Sheet 2
Fig. 2a
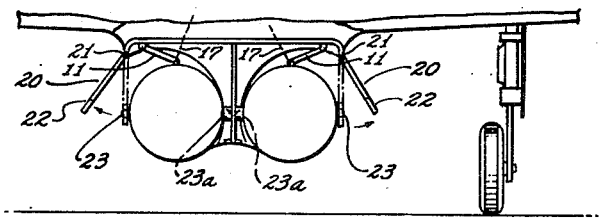
Fig. 2b
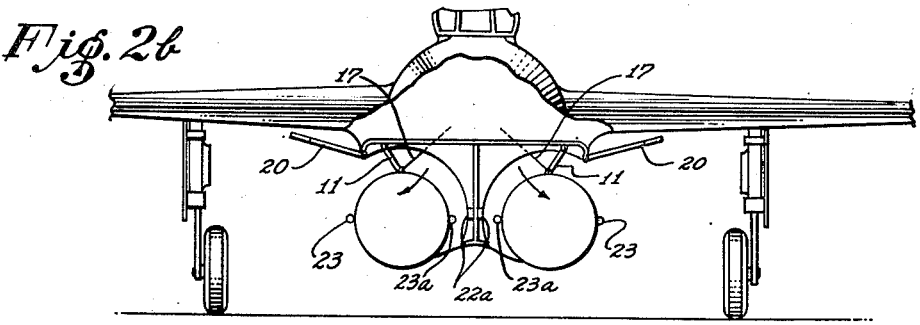
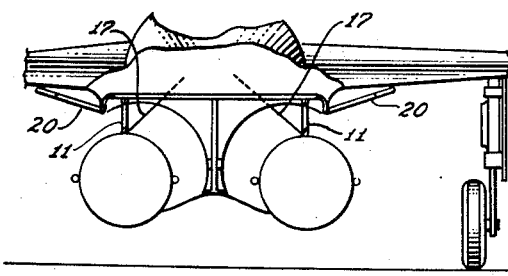
Fig. 2c
Fig. 2d
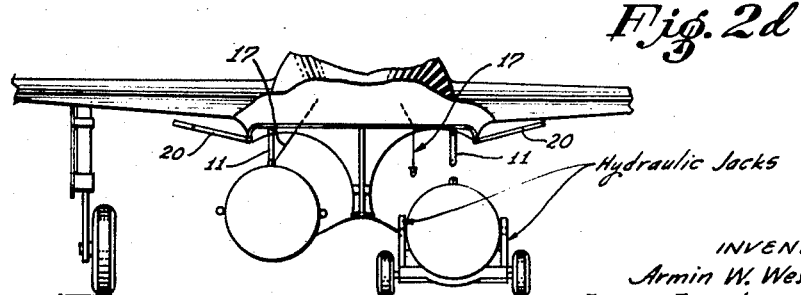
INVENTORS
Armin W. Westphal
Jesse Tom Laurie
Bernard F. Irwin
By Herbert E. Metcalf
Their Patent Attorney

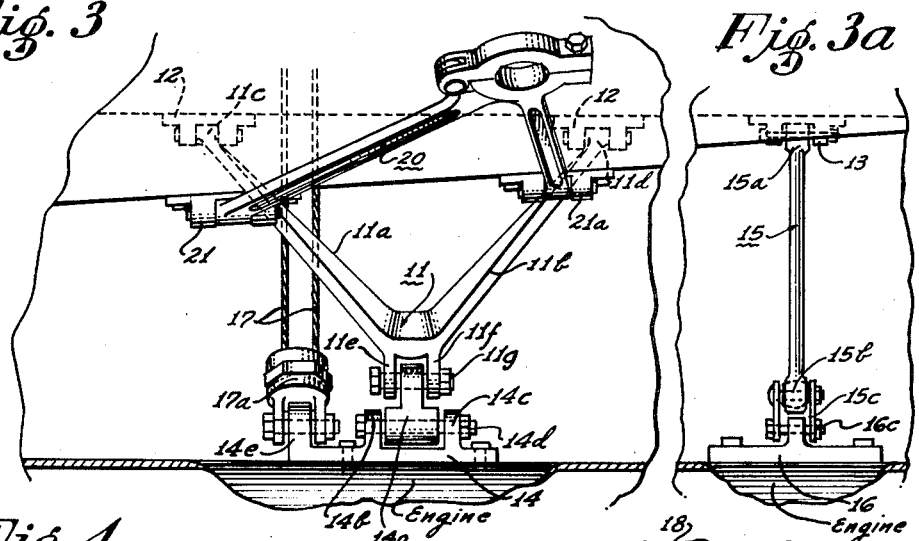

United States Patent Office 2,815,184
Patented Dec. 3, 1957

2,815,184

AIRCRAFT ENGINE HOIST AND MOUNTING SYSTEM

Armin W. Westphal, North Redondo, and Jesse Tom Laurie and Bernard F. Irwin, Los Angeles, Calif., assignors to Northrop Aircraft, Inc., Hawthorne, Calif., a corporation of California Application April 2, 1954, Serial No. 420,546

11 Claims. (Cl. 244—54)

This invention relates to methods of aircraft engine installation, and more particularly to a means for securing a jet engine in operating position in an airplane together with an integrated hoisting device by which the engine is lowered from engagement with its attach points to an inspection position spaced laterally of the fuselage, and at a convenient working height for service mechanics standing on the ground.

The life of any aircraft engine, between overhauls, is comparatively short, and wartime observers quickly realized that the slow and laborious service procedures necessary to keep military planes in operation were cutting the Allies air combat efficiency substantially, and imposing heavy costs both through lost flying time per plane and because of the high ratio of reserve planes necessary to keep a specified number ready for flight. One of the main service problems was that of removing the engines and reinstalling them on their replacements; only a small crew could work in and around an engine nacelle, and hundreds of man hours were required to disconnect the maze of controls, release the engine from its mountings and lower it awkwardly to the ground.

Bad is it was with mass produced models, this situation was even more difficult in connection with highly specialized aircraft designed for limited and specific tactical purposes of which there are so few in existence that no reserves are available. Jet engines, operating in greater ranges of speed and under widely variable conditions of flight would demand even more frequent inspection.

The object of this invention is the provision of means for hoisting an engine into position of fixed attachment within an airplane, requiring only a small crew of mechanics and a minimal amount of physical effort, and requiring no ground supplied auxiliary power supply.

Another object of this invention is the provision of convenient means for holding the engine in position adjacent its points of attachment to the airplane while openable portions of journal members are being closed and secured.

A further object of this invention is the provision of means for swinging the engine downwardly and outwardly from its normal position within the fuselage of the airplane to a point above the ground at which it may be conveniently inspected and worked upon by members of the ground crew.

An additional object of this invention is the provision of means invested in the outer periphery of the aircraft fuselage providing readily available and unobstructed access to the engine compartment through which the engine may be removed or replaced, and the closure means itself being quickly replaceable to provide a weather proof closure without the use of tools or special devices.

A still further important object of this invention is the provision of simple means for attaching and detaching control and fuel supply implements interconnecting the engine and the airplane.

Another object of this invention is the provision of means by which access for purposes of inspection and adjustment may be had to the side of the engine disposed immediately adjacent a structural keel member or firewall, and through which such access is available without disconnecting the control and fuel supply conduits.

A major and most important object of this invention is the provision of integrated and cooperative means through which one jet engine may be removed from a jet airplane and a second jet engine completelly installed in place of the first and actually running within a period of minutes— rather than hours or days.

In brief, our invention includes a complete handling system for lifting a jet engine into place in an airplane, fastening it therein and removing it therefrom with a minimum of manual effort on the part of a minimal ground crew, and utilizing no auxiliary power source external of the airplane.

For obvious reasons, our invention presupposes that the engines to be handled by the apparatus of this invention will be standardized in size and form and have their points of attachment to the structure similarly disposed on their outer surfaces. Furthermore, this invention anticipates placement of the engines in the downwardly disposed portions of an aircraft fuselage or similar nacelle-like enclosure.

Other objects of this invention, in addition to those mentioned specifically above, will become apparent in the specifications covering one preferred embodiment of this inveniton set forth in the following description and on the accompanying drawings, in which:

Figures 2a through 2d show progressively the relative positioning of various cooperating elements during different periods of a typical operating cycle.

Figure 2a is taken along the same section as Figure 2, and shows the outboard engine mounting brackets detached from their respective engines and swinging up and outwardly under the wings.

Figure 2b is a diagram similar to Figure 2a showing the engines detached at their keel line mounts and swinging out and downwardly.

Figure 2c is similar to those preceding but shows the engines at the lowest point of their arcs of movement in the so-called inspection position.

Figure 2d is similar to Figure 2c except that the engine at the right of the diagram has been completely detached from the airplane and lowered to a dolly on the ground.

Figure 3 is a schematic diagram of the left side of the left engine shown in previous figures, showing the forward sway bar and hoist cables, and the rear sway bar in Figure 3a, as they appear when the engine is lowered to the "inspection position" together with the forward trunnion mount, detached from the engine and swung upwardly out of the way.

Figure 4 is a diagrammatic plan view showing the positioning on the engine of the hoist and engine attach points, with the sway bars shown in the "engine up" position.

Figure 5 is a sectional view of the combined aft hoist cable and engine attachment fitting as it would appear with the engine lowered to the inspection position.

Figure 6 is a schematic, exploded diagram showing the general layout and arrangement of the hydraulic hoist mechanism serving one engine.

Figure 7 is a fragmentary diagram of one of the outboard engine mount brackets showing the manner in which it is pivoted to the airplane structure, and the method for pivoting the lower half of the trunnion mount to permit lowering of the engine from its normal operating position.

Referring again to Figure 1: the airplane used therein to show this preferred embodiment of our invention, includes the conventional elements with a forward nose section, 1a and canopy enclosed cockpit 1b located in the forward portion of the main fuselage 1, and the left wing 4 and landing gear strut 5 shown at the right side of the figure. Less conventional, however, is the manner in which the jet engines are housed within longitudinally disposed chambers on each side of the keel, the chambers such as 3, bulging outwardly beyond the normal contour of the lower fuselage, and having their forward portions including air inlet openings faired into the lower fuselage adjacent the leading edge of the wing as shown at 2.

Figure 1:
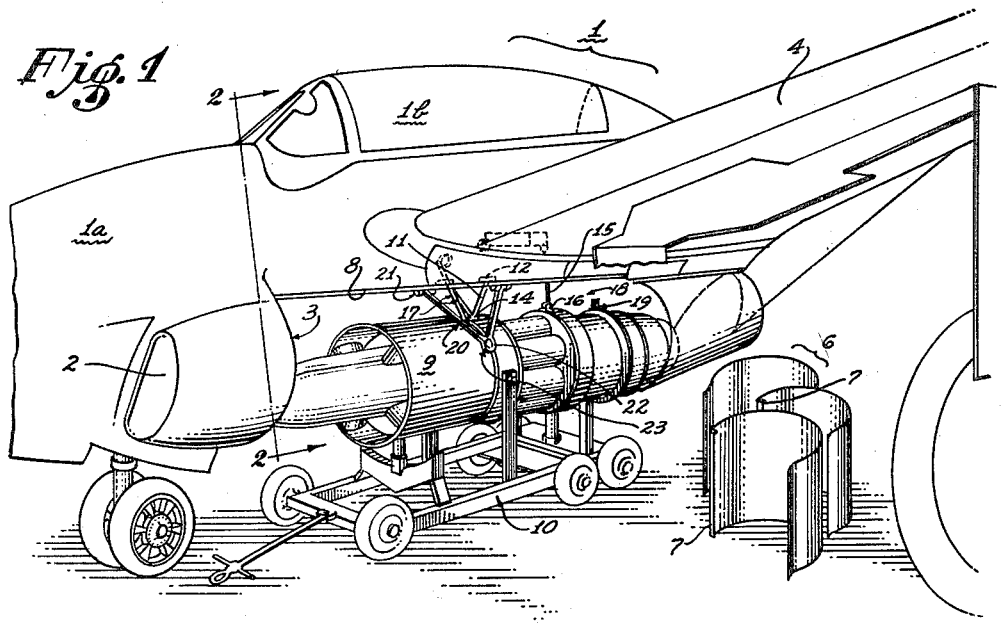
Figure 1 is a perspective view of an airplane embodying features of this invention. Engine compartment doors are removed in this view to reveal the positioning of the engine in the under portion of the fuselage.

In the perspective view in Figure 1, several of the semicylindrical doors 6 having contoured end members 7 engageable with continuous channel 8 affixed to the structure of the airplane, have been removed to reveal the engine 9, lowered from its normal position of attachment in the airplane and about to be lowered onto the dolly 10 by separate hydraulic means integrated within the dolly.

Six separate elements cooperate in holding the engine in secure attachment during flight of the airplane and in guiding it and raising and lowering it into and out of the operating position attachment fittings. The relative positioning of these various elements can best be understood by comparing Figure 1 with the diagrams of a lateral section at approximately the leading edge of the wings in Figures 2, 2a, 2b, 2c and 2d, which show progressively various stages in the lowering of an engine. The same number is used to identify a particular reference in all of the figures.

The forward sway bar 11, best seen in Figure 3, includes two diagonally disposed support members 11a and 11b which terminate in bearings 11c and 11d adapted for pivotal attachment with brackets 12 fixedly attached to the airplane structure adjacent the outer longitudinal edge of the upper portion of the engine enclosure. Disposed outwardly from the junction of the support members 11a and 11b, are extension lugs 11e and 11f having aligning through bores adapted for pivotal attachment by means of removable bolt 11g to expansion link 14a which in turn is pivoted by means of removable pin 14d and lugs 14b and 14c to engine attach fitting 14, the latter being fixedly attached to the engine in the central forward position indicated in plan view of the engine, Figure 4.

The aft sway bar 15, best seen in Figure 3a, is similarly attached at its upper end by ball joint 15a to fitting 13 fixedly attached to the airplane structure adjacent the outer upper edge of engine compartment in suitable longitudinal alignment with the pivotal attach points 12 of the forward sway bar 11, and at its opposite end by means of the ball joint 15b, compensating links 15c and removable bolt 16c to the attach fitting 16.

As shown in Figure 4, both the forward and rear sway bars are pivoted along the upper longitudinal edge of the engine compartment adjacent the hinge line of the removable doors, and are adapted to swing up and inwardly toward the keel of the airplane. The forward sway bar 11, being pivoted to the structure at two points, moves through a definitely predetermined arc and provides rigid positioning to an engine attached thereto except for a small amount of lateral movement permitted by the pivoted link 14a which is required to offset the normal increase in engine size occurring during the change from cold to operating temperatures. The aft sway bar 15 also serves to hold the rear portion of the engine in proper relative alignment with and spacing from the keel line of the aircraft, and requires a spacing link 15c although there is no radially disposed engine-to-keel attachment adjacent thereto. Ball joints 15a and 15b compensate for longitudinal engine growth due to thermal expansion.

Figure 2:
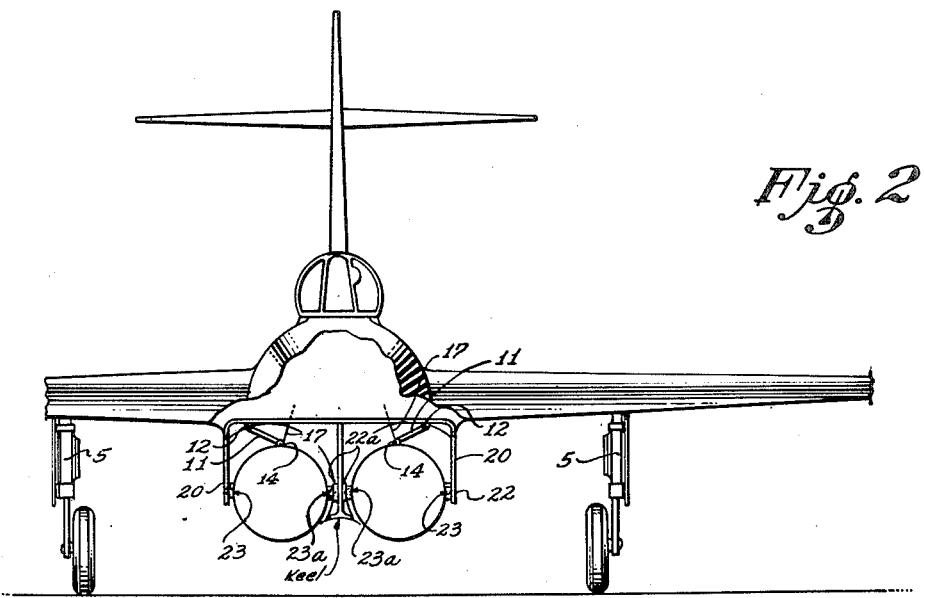
Figure 2 is a cross sectional diagram taken through the main body portion of the fuselage of the airplane adjacent the forward point of attachment of the engines as indicated by arrows in Figure 1, and the subsequent four secondary

Ball shaped trunnions 23 and 23a in Figures 1 and 2, adapted to carry the greater part of the engine load, are disposed on opposite sides of the engine forward of its longitudinal center adjacent the point of greatest concentration of engine weight. A third ball-shaped trunnion fitting 19, best seen in Figure 5, is disposed rearwardly along the top of the engine housing adjacent the afterburner. This aft trunnion assembly 19 includes a base member 19a fixedly attached to the engine, a ball-shaped trunnion member 19b with split shank 19c pivoted to a pivot block by means of bolt 19d, the pivot block, in turn being pivoted to the base 19a by means of bolt 19e. The pivot point 19e permits the trunnion ball 19b to rotate in plane of the longitudinal axis of the engine to compensate for engine growth caused by thermal expansion of the engine, while the second pivot bolt 19d permits rotation in a diametric plane perpendicular to the longitudinal axis of the engine, to effect direct alignment of the ball and the hoist cable 18 throughout the arc of movement involved in the hoisting operation.

The generally ball-shaped trunnions 23 in Figure 1 and 23 and 23a in Figures 2 through 2d, 4 and 7, attached to the forward portion of the engine, are adapted for engagement with socket fittings 22 and 22a which are split axio-diametrically to facilitate convenient seating of the trunnion members in their respective socket mounts, and the quick attachment therein and release therefrom.

Figure 7 shows in greater detail the outboard mount assembly, 20 in Figure 1, having diagonally disposed supporting arms 20a and 20b terminating upwardly in coaxially aligned bearing members 20c and 20d secured by suitable pivot pins to brackets 21 and 21a which are fixedly attached to a load-bearing longitudinal structural member in the airplane.

The arms 20a and 20b join at their downward ends, as shown at 20k in Figure 7, where they are integrated with the concave upper half-portion of journal member 22. The lower half-portion 22f is adapted to swing downwardly on pivot pin 22b and is secured in juxtaposition with the upper half-portion by lock bolt 22c holding the outboard engine trunnion 23 firmly positioned therebetween. The attaching plate 23c and bolts 23d used to fasten the trunnion ball 23 to the engine, are also shown in Figure 7. When disconnected from the engine, the support bracket 20 is swung upwardly against the under side of the wing, out of the way of the line of movement of the descending and outswinging engine.

The inboard trunnion mounts 22a are affixed to the central keel member of the aircraft. Their lower half portions are pivoted to swing downwardly in the same manner as the corresponding part 22f in the outboard assembly in Figure 7, but the upper half-portion is solidly and permanently attached to a strong, load-bearing structural member of the airframe and is the determining factor in establishing and maintaining proper positioning of the engine relative to the airplane. And since it is the only definitely fixed and inflexible point of attachment between the engine and airplane, all measurements and calculations of longitudinal, lateral and diagonal engine growth caused by thermal expansion at operating temperatures must be related in some manner to this mounting point.

The rear engine trunnion mount assembly, 24 in Figure 5, includes a generally cylindrical main body member 24a having an axially aligned threaded bore 24k disposed inwardly from one flat end and terminating adjacent the longitudinal center of the main body in a semi-spherical concavity conformed to fit snugly with the convex surface of trunnion 19b. A plug member 24b having a concave inner face 24d, also conformed to fit snugly with surface of trunnion member 19b, is threaded into the axial bore, and has means outside the bore at end spaced from its concave face, for rotating the plug member within the bore, tightening it against the trunnion member and locking the parts in tight engagement. A second bore, 24g, normal to the circumference of the main body portion 24a, permits entry of the trunnion ball 19b through the outer wall of the main body portion into the bottom of the axial bore and in general axial alignment with the main body, the axial bore and concave face of the plug member therein and the opposite concave inner termination of the axial bore.

A third bore, 24h, in the upper longitudinal surface of the main body portion, permits the hoist cable to pass upwardly into the fuselage of the airplane to the hydraulic hoisting unit.

The cables, 17 in Figures 1, 2, 3 and 6, are utilized to raise and lower the forward portion of the engine where most of the weight is concentrated, two cables being used to provide the desired strength yet avoid the stiffness and consequent friction resulting from the use of a single cable of larger diameter. Furthermore, since each cable is strong enough to support the dead weight involved, a second cable provides a desirable although temporary safety factor in the event of the complete failure of the first.

These cables, 17, terminate and are retained in a single clamp fitting 17a which, in turn, is pivoted by means of pivot pin 14e to the forward portion of the forward engine attach fitting 14 best seen in Figure 3.

Referring again to Figure 6, the forward hoist cables, 17, extend upwardly from the engine attach fitting, around pulleys 17h and 17b and around pulley 17d attached to the outward end of retractable rod 18r extending from hydraulic cylinder 18g, thence the cables travel around pulley 17c and terminate in turnbuckle attachments 17f to opposite ends of small equalizer bar 17k which is pivoted to one end of the large tension equalizing bar 17y pivoted at 17x to a fixed point on the hydraulic assembly structural framework.

The rear hoist cable 18, as seen in Figures 5 and 6, extends upwardly through an opening 24h in the top of the rear trunnion mount 24 into the fuselage of the airplane and turns on a guide roller at 18a to a horizontal line of travel to pulleys 18c and 18d which, like pulley 17d, is attached to the retractable piston rod 18r, and thence around pulley 18e to turnbuckle attachment 18f which is pivoted at 18k to equalizer bar 17y at end opposite the attachment point 17k of forward hoist cables 17. The pivot point 17x of the equalizer bar 17y is spaced between the two cable attachment points so as to equalize the application of force in proportion to the weights involved at each end. The equalizer bar, additionally, serves to compensate for differences in stretching of the respective cables and assures proper and positive seating of the forward and rearward trunnions in their respective mounts. A small equalizing bar 17k is provided to offset variations in the elongation of the twin cables 17 during extended operational cycling.

The hoisting and lowering of an engine with the apparatus previously described is quite simple, and is shown in a series of diagrammatic views, Figures 2, 2a, 2b, 2c, and 2d which indicate the relative positioning of the major functional elements at different stages of one operating cycle.

In Figure 2, a lateral through section taken adjacent the leading edge of the wing, the engines are secured in their normal operating positions, their outboard engine trunnions, 23 right and left, being locked in socket-type mounts 22 in the downward ends of support brackets 20, and the inboard engine trunnions, 23a right and left, being similarly secured in socket-type mounts 22a, the upper half-portions of which are fixedly attached on opposite sides of the central keel member of the airframe. Also, as shown in Figure 2, when the engines are in their normal operating position the sway braces 11 are pivoted laterally at points 12 to their upward limits and hoist cables 17 are fully retracted.

In Figure 2a the outward trunnion mounts 22 have been detached from outboard engine trunnions 23 and support brackets 20 are being swung upwardly on the pivots at 21 to an underwing position removed from the line of engine movement.

Figure 2b shows the support brackets 20 swung upwardly out of the way, inboard trunnion mounts 22a at the keel of the airplane detached from their respective inboard engine trunnions 23a, hoist cables 17 being extended and sway braces 11 and the engines themselves swinging downwardly and outwardly from their former positions.

In Figure 2c the engines are shown lowered to the inspection position; cables 17 are no longer under tension and the entire engine weight is being carried by the forward sway braces 11 and the rear sway braces 15 which are not shown in this series of diagrams since they are in direct visual alignment with forward braces 11, but can be seen, as previously mentioned, in Figure 1.

In Figure 2d the engine at the right side of the diagram has been disconnected from the sway braces 11 and 15, and the engine has been lowered onto a field dolly by means of hydraulic jacks built into the dolly. The end of hoist cable 17, also detached from the engine, hangs downwardly from its suspension point adjacent the floor of the airplane fuselage.

Power to raise the engines from the inspection position to normal operating position is supplied by a suitable hand pump installed in the crew's cockpit within the airplane fuselage thus making the operation of the hoist independent of the engines or auxiliary power units within the airplane or on the flight field.

An engine is lowered by cracking the release valve 25 attached to hydraulic line to cylinder 18g.

The complete operation involved in lowering and detaching an engine from the airplane comprises the following sequential steps: engine compartment doors, 6 in Figure 1, are swung upwardly and removed to provide clear access along entire length of the engine; fluid pressure from the hand pump is introduced into hydraulic cylinder 18g to retract piston rod 18r, thus tightening cables 17 and 18 and taking weight off engine trunnion mounts 22, 22a and 24 while their lower half-portions are being disconnected; the trunnion mount support bracket 20 is swung upwardly and out of the way under the wing; pressure release valve 25 is opened permitting tension rod 18r to move outwardly of the cylinder paying out cables 17 and 18 and lowering the engine through a laterally disposed arc of movement determined by sway braces 11 and 15; when cables 17 and 18 become slack and engine is supported entirely by the sway braces, the cables are disconnected from their respective engine attach points 14 and 19; control and fuel lines from airplane to engine are severed by means of quick disconnecting fittings; the cradle of a field dolly is positioned beneath the engine and elevated to raise the engine slightly and take its weight off the sway braces while they, in turn, are disconnected from their engine attach points 14 and 16, and engine is lowered to the engine bed mounts in the dolly frame by means of the hydraulic jack with which the dolly is equipped.

Replacement of the engine or the installation of a second engine is accomplished in approximately the same length of time by following the same steps in reverse sequence except that raising the engine by means of the hand pump is considerably more laborious and time consuming than lowering the engine by means of the pressure release valve. Checks of the time required for engine removal and replacement by ground crews of only average experience operating under normal field service conditions show that engine replacements as generally outlined above can be accomplished in a relatively few minutes; in many cases fewer minutes than the hours previously required with conventional fuselage designs and orthodox engine installation systems.

Although in order to comply with the statute, the invention has been described in language more or less specific as to structural features, it is to be understood that the invention is not limited to the specific features shown, but that the method, means and construction herein disclosed comprise a preferred form of putting the invention into effect, and the invention is therefore claimed in any of its forms or modifications within the legitimate and valid scope of the appended claims.

What is claimed is:

1. Engine hoist and installation apparatus comprising: a plurality of mounting means affixed to an aircraft having a fuselage and an elongated engine compartment with an opening in said fuselage providing access to said compartment and bearing members attached to an aircraft engine, said mounting means being adapted to receive said bearing members and being openable to permit entry and removal of said bearing members; a plurality of rigid means pivotally attached to said aircraft for supporting said engine outboard of the engine compartment of said aircraft in a position wherein it is completely accessible for inspection purposes, said rigid means being further adapted to rotate laterally of said engine compartment and guide said engine into its normal operating position and enter said engine bearing members in said mounting means in said engine compartment; means integral with said rigid means for absorbing lateral thrust of the engine weight during flying maneuvers; and means integral with one of said mounting means and bearing members effective to compensate for lateral and longitudinal thermal expansion of said engine when at operating temperature.

2. Engine hoist and installation apparatus in accordance with claim 1 in which said mounting means comprises: a plurality of openable load-bearing mounting fixtures rigidly attached to said aircraft structure within said engine compartment, one of said rigidly attached mounting fixtures being disposed inboard of said engine, another of said rigidly attached mounting fixtures being disposed upon said aircraft structure directly above the aft end of said engine; a movable mounting assembly adapted for attachment to the outboard side of said engine at a point diametrically opposite said inboard mounting fixture, including an openable mounting fixture disposed at the lower end of a spanning member pivotally attached at its upper end to said aircraft structure along the outboard side of said engine compartment whereby said openable mounting assembly is movable outwardly and upwardly of said engine compartment to a position above and clear of the space occupied by said engine when in said inspection position.

3. Apparatus in accordance with that described in claim 2 in which said spanning member of said movable mounting assembly is V-shaped with two diagonally disposed arms extending upwardly from said openable mounting fixture and terminated in axially aligned bearing members pivotally attached to the upper outboard section of said engine compartment parallel to the longitudinal axis of said aircraft, whereby said diagonally disposed arms of said mounting assembly serve to absorb fore and aft thrust forces developed by the weight of the engine during flight maneuvers.

4. Engine installation and removal apparatus comprising: a plurality of concave socket-type trunnion mounts attached to an aircraft, having a fuselage defining an engine compartment with an opening in said fuselage providing access to said compartment, and adapted for engagement with ball-type trunnions fixed to the outer surface of an engine, said trunnion mounts being openable for quick release of the engine trunnions when engaged therein; movable engine supporting means including a plurality of load-bearing pivoted arms positioned within the engine compartment and adapted for direct attachment to said engine for holding the latter suspended in a position providing ready access to the entire periphery thereof for purposes of inspection or adjustment, said load-bearing pivoted arms being further adapted to swing inwardly and bring said ball-type trunnions on the engine into proper alignment and juxtaposition with said mating socket-type mounts affixed to the aircraft.

5. Engine installation and removal apparatus in accordance with claim 4, wherein said movable supporting means also include: a plurality of retractible cable members attachable to the engine in longitudinal alignment with the points of attachment of said pivoted arms and attached to the aircraft at points spaced inboard of the pivot points of said arms on said aircraft and directly above the longitudinal centerline of the engine when secured in said fixed trunnion mounts.

6. Engine hoist and installation apparatus suitable for hoisting and positioning a generally cylindrical engine in a partially open compartment defined by major supporting structure, comprising: a plurality of openable mounting fixtures affixed to the major structure and adapted to receive mating bearing members fixedly attached to an engine; a plurality of rigid supporting members longitudinally spaced along the axis of said engine and pivotally attached to said major structure at one end and attachable to said engine at the other end, said rigid supporting members being adapted when rotated laterally and upwardly, with respect to the longitudinal axis of said engine, to direct said engine bearing members into said mounting fixtures; a plurality of flexible support members depending from said major structure spaced along a line directly above the longitudinal axis of said engine when engaged in said fixed mounting fixtures, said flexible support members being attachable to said engine adjacent points of attachment of said longitudinally rigid supporting members, and adapted for retraction into said compartment whereby said engine is directed through an arc of movement and into said compartment by said rigid supporting members and maintained at any elevation within said arc by said retractable flexible support members.

7. In an aircraft having structural members and an engine compartment opening to the exterior of said aircraft and aligned parallel to the longitudinal axis of said aircraft and into which a generally cylindrical engine may be installed from below, engine hoisting and positioning apparatus comprising: a plurality of supporting arms pivoted to the structural members of said aircraft and hanging downwardly therefrom prior to the mounting of said engine in said compartment, said supporting arms being adapted to rotate in a direction normal to the longitudinal axis of said aircraft and being attachable at their downward ends to mating fittings spaced along the outer surface of said engine, and being further adapted to remain attached to said engine while in operation to absorb lateral thrust forces generated by the weight of said engine during flight maneuvers; a plurality of flexible supporting members depending from said structural members at points aligned above the center line of said engine when in operating position in said compartment, said flexible members being retractable into said aircraft by means of a hydraulic actuator having a piston rod and end portions of said flexible supporting members being attachable to mating fittings spaced along upper surface of said engine above its longitudinal center line.

8. Apparatus in accordance with claim 7 wherein at least one of said flexible supporting members is fitted with a ball-type bearing member adjacent its end attachable to said engine and passes through a lockable socket-type mounting fixture attached to said structural members whereby, when said one flexible supporting member is fully retracted within said aircraft, said bearing member is entered in said socket-type mount and said engine is thereby firmly secured to said aircraft structure in proper relative longitudinal alignment therewith.

9. Apparatus in accordance with claim 7 wherein said engine compartment is provided with openable fixed position mounts adapted to receive mating bearing members attached to said engine, said mating bearing members being entered in their respective mounts when retraction of said flexible supporting members is complete, and said bearing members being lockable in said fixed mounts to remove engine load from said flexible supporting members while said engine is in operation in said aircraft.

10. Apparatus in accordance with claim 7 wherein said plurality of flexible supporting members includes two identical flexible cables, each capable of supporting the engine without the other, both being attachable at their outboard ends to a common attachment fitting affixed to the upper periphery of said engine directly above the center of gravity thereof, and both being retractable into said aircraft along juxtaposed coaxially aligned pulleys and attached at their inboard terminations to opposite ends of a first centrally pivoted equalizing bar mounted on said structural members whereby said identical cables share the weight of said engine equally, thereby causing less friction, providing greater strength and a greater margin of safety than a single larger cable.

11. Apparatus in accordance with claim 10, including a second centrally pivoted equalizing bar pivotally connected at one of its ends to said first centrally pivoted equalizing bar at a position intermediate to the attachment points of said identical flexible cables on said first equalizing bar, and connected at its other end to one of said flexible supporting members, said one of said flexible supporting members being attachable at its outboard termination to the rearward portion of said aircraft engine, said second equalizing bar being pivoted at a point intermediate of its ends proportionate to the loads being carried by the respective cables, said second centrally pivoted equalizing bar serving both to properly divide the pressure between the retractable cables and to transfer the pressure force to the cable serving the unseated engine bearing members in cases wherein all such bearings fail to engage their respective mounting fixtures simultaneously.

References Cited in the file of this patent
UNITED STATES PATENTS

| | | |
|---|---|---|
| 2,529,955 | Morley | Nov. 14, 1950 |
| 2,587,345 | Lombard | Feb. 26, 1952 |
| 2,633,312 | Hagger | Mar. 31, 1953 |

FOREIGN PATENTS

| | | |
|---|---|---|
| 128,423 | Great Britain | June 26, 1919 |
| 1,006,380 | France | Jan. 23, 1952 |